United States Patent [19]
Hecht et al.

[11] Patent Number: 5,661,737
[45] Date of Patent: Aug. 26, 1997

[54] MULTI-WAVELENGTH LASER BEAM DETECTOR WITH REFRACTIVE ELEMENT

[75] Inventors: Hartmuth Hecht, Burlingame; Edward Reed, Sunnyvale, both of Calif.

[73] Assignee: Coherent, Inc., Palo Alto, Calif.

[21] Appl. No.: 599,249

[22] Filed: Feb. 9, 1996

[51] Int. Cl.$^6$ .................. H01S 3/10; G02B 5/04
[52] U.S. Cl. .................. 372/23; 372/9; 372/20; 372/109; 359/837
[58] Field of Search .................. 372/9, 10, 20, 372/92, 23, 97, 99, 100, 101, 108, 109; 385/36, 140; 359/833, 834, 835, 837

[56] References Cited

U.S. PATENT DOCUMENTS

| | | | |
|---|---|---|---|
| 4,504,123 | 3/1985 | Smith | 359/483 X |
| 4,711,526 | 12/1987 | Hennings et al. | 350/170 |
| 4,824,200 | 4/1989 | Isono et al. | 385/24 X |
| 5,002,371 | 3/1991 | Wright | 372/106 X |
| 5,121,404 | 6/1992 | Aoshima et al. | 372/75 |
| 5,280,536 | 1/1994 | Dumond et al. | 372/82 |
| 5,558,667 | 9/1996 | Yarborough et al. | 606/9 |

FOREIGN PATENT DOCUMENTS

| | | | |
|---|---|---|---|
| 0 425 309 A2 | 5/1991 | European Pat. Off. | H01S 3/102 |
| 59-33404 | 2/1984 | Japan | 385/140 X |
| 60-164718 | 8/1985 | Japan | 385/36 X |
| 62-19817 | 1/1987 | Japan | 385/36 X |

*Primary Examiner*—Brian Healy
*Attorney, Agent, or Firm*—Limbach & Limbach L.L.P.

[57] ABSTRACT

A detector system for providing a plurality of output beams for monitoring the output beam of a laser system. The detector system includes a refractive element having a pair of opposing spaced-apart faces. The laser beam enters the refractive element where it undergoes multiple internal reflections off of the faces. A portion of the beam is transmitted out of the refractive element at each of the reflections to form a plurality of increasingly attenuated output beams having different power intensities from each other. A plurality of detectors are positioned for measuring the different beam characteristics of the plurality of attenuated output beams, which correspond to the beam characteristics of the laser output beam.

27 Claims, 7 Drawing Sheets

MULTI-WAVELENGTH LASER BEAM DETECTOR WITH REFRACTIVE ELEMENT

FIELD OF THE INVENTION

The present invention relates to laser beam monitoring devices, and in particular to a refractive element that provides a plurality of detector beams of varying power and energy levels.

BACKGROUND OF THE INVENTION

It is widely known to monitor the output beam from a laser system to measure various output beam parameters, such as power level, pulse amplitude, pulse width, spatial mode, etc. during laser system operation. Typically, a beam splitter is used to pick off a small portion of the output beam and direct it to one or more detectors.

Different types of detectors are used to measure the different laser beam parameters. Therefore, a single laser system may contain several different types of detectors. Each detector type accurately operates with a particular range of optical input powers. If the power of the reflected beam impinging upon a detector is below that detector's operational range, the measurement will be inaccurate. If the incoming power is above the detector's operational range, the detector can become saturated, such that the measurement will be inaccurate. In more severe cases, the detector could be damaged.

It is known to place neutral density filters in front of detectors to attenuate the intensity of a beam impinging upon the detector. It is also known to move and/or expand the operational range of detectors by designing special detector electronic circuits that automatically adjust the gain of the detector circuit to compensate for different power levels.

Modern laser systems produce output beams having widely varying power levels, pulse widths, and wavelengths. These systems require different detector types to measure the different laser beam parameters, such as average power, pulse energy, pulse width, pulse shape, spatial mode, etc. The various types of detectors used with these lasers must operate over the flail range of operational output powers, pulse widths, and wavelengths.

Using neutral density filters in front of detectors in modern laser systems have several drawbacks. First, for systems with a plurality of detectors, adding these additional optical elements for each detector adds to the complexity and cost of such a system. Second, even though these filters are labeled "neutral density", they are not fully wavelength independent. Therefore, if the output beam is tuned to a different wavelength, the attenuation of the neutral density filter can change. Finally, a neutral density filter cannot maintain proper input power to the detector if the laser power is changed dramatically.

Complex and costly electrical systems have been incorporated into detector devices to change the gain of the detector system to compensate for changes in power level. The changed gain enhances the effective operational range of the detector, allowing it to measure a wider range of power levels. However, these electrical systems are costly for those laser systems containing many detectors. Further, these electrical circuits can only broaden the detector's operational range only so far. Electronic circuits cannot compensate for extremely large changes in input power, pulse width, or wavelength. Nor can they prevent damage to the detector from very high input beam powers.

There is a need for a simplified means for monitoring the different parameters of the output laser beam that is substantially wavelength insensitive. Further, there is a need for a means for monitoring the different parameters of the output laser beam despite very large changes in output power, pulse energy, pulse width, and wavelength.

SUMMARY OF THE INVENTION

The present invention solves the aforementioned problems by providing a device that creates a substantially fixed attenuation over a broad range of wavelengths. The device also provides a plurality of detector beams of different attenuation, whereby different detectors having different operational input power ranges can operate simultaneously to monitor the output beam of a laser system.

The detector system of the present invention includes a refractive element having a pair of opposing spaced-apart faces. The refractive element is transmissive to the laser beam and located such that when the laser beam enters the refractive element through one of the faces, the laser beam is split into at least a primary output beam and a secondary beam at the other of the faces. The primary output beam exits the refractive element through the other of the faces. The secondary beam undergoes multiple internal reflections off of the faces wherein a portion of the secondary beam is transmitted out of the refractive element at each of the reflections to form a plurality of increasingly attenuated output beams having different power intensities from each other. A plurality of detectors are aligned with one or more of the output beams exiting the refractive element for measuring beam characteristics of the output beams which correspond to beam characteristics of the laser beam.

Other objects and features of the present invention will become apparent by a review of the specification, claims and appended figures.

DETAILED DESCRIPTION OF THE PREFERRED EMBODIMENTS

The present invention is a detector system that produces multiple detector beams of varying intensity. The intensity of the various detector beams is minimally effected by changes in wavelength. The detector apparatus is ideal for monitoring the various laser beam parameters from laser systems that produce output laser beams of widely changing power level, pulse width, and/or wavelength, with minimal space requirements and complexity.

Figure 1:
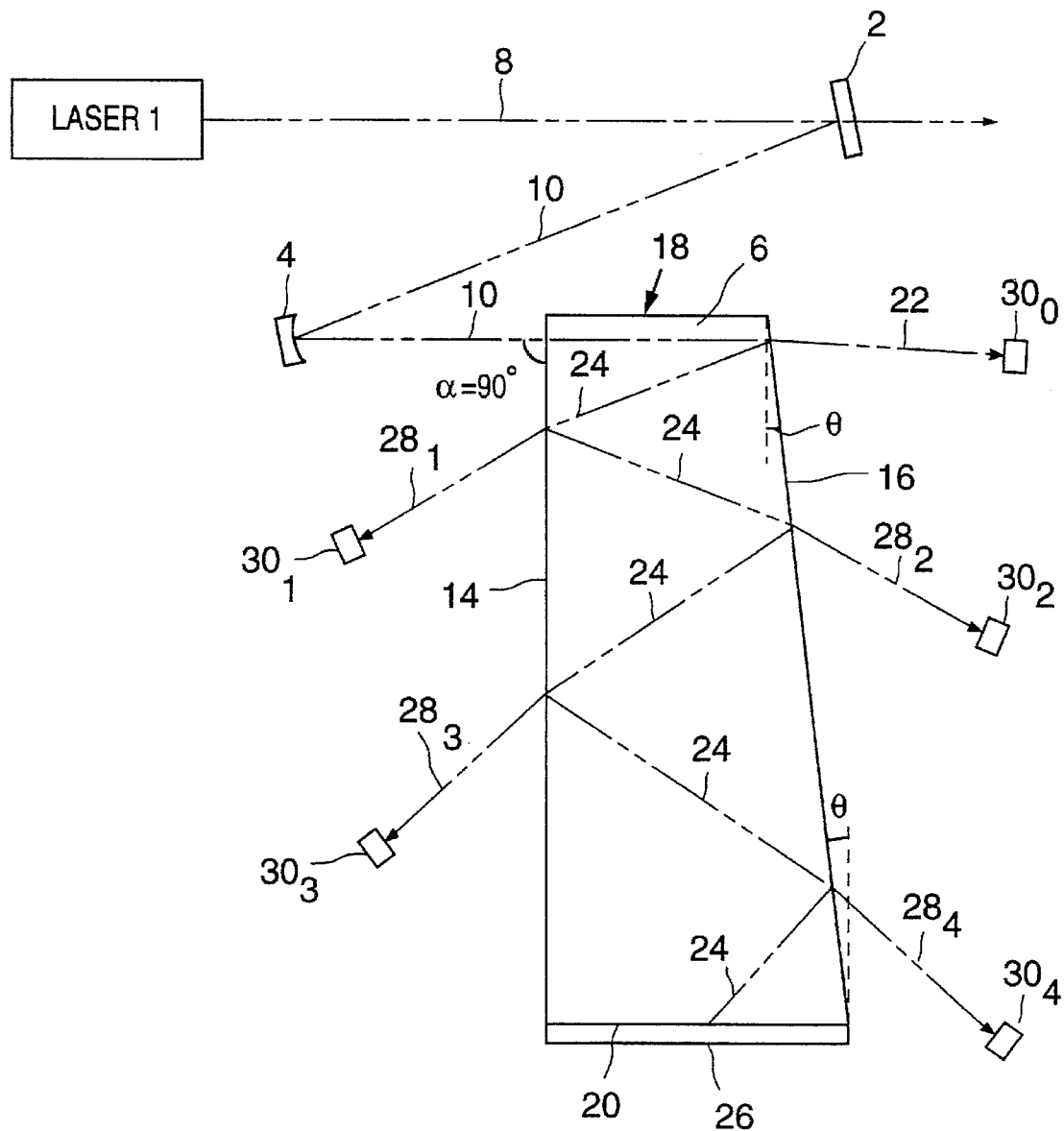
FIG. 1 is a top plan view of the detector system of the present invention.

The detector system of the preferred embodiment is illustrated in FIG. 1, and includes a beam splitter 2, a focusing mirror 4, and a refractive element 6.

The beam splitter 2 picks off a small portion of an output beam 8 from a laser system 1 to be monitored. The reflected pick-off beam 10 is directed to a focusing mirror 4.

The focusing mirror 4 focuses the pick-off beam 10 while re-directing it toward the refractive element 6. The focusing mirror 4 is not essential to the present invention if the pick-off beam 10 has a low divergence such that the diameter of any beams produced therefrom incident on optical detectors (to be described later) is smaller than the effective detecting surfaces of those detectors. If focusing is not required, then mirror 4 can be a flat mirror. If the spatial requirements of the detection system do not necessitate folding the pick-off beam 10 to the refractive element 6, then mirror 4 can be eliminated altogether.

The refractive element 6 is a solid optical element in the shape of a wedge. The wedge shaped refractive element 6 can be made of any optically transparent material, such as fused silica. The refractive element 6 has two opposing faces, front face 14 and rear face 16, as well as parallel top and bottom surfaces, 18 and 20 respectively. Rear face 16 forms the wedge angle $\Theta$ with a line parallel to front face 14.

The refractive element 6 is positioned such that the pick-off beam 10 enters the refractive element through front face 14 at an angle normal to face 14. A small amount of beam 10 is reflected at surface 14 as beam 10 enters the refractive element 6. The pick-off beam 10 travels through the refractive element 6 and is split at rear face 16 into a primary beam 22 and a secondary beam 24. The primary beam 22 is transmitted out of the refractive element 6. The secondary beam 24 is reflected off of rear face 16 back towards front face 14. The secondary beam 24 continues to undergo multiple internal reflections off of front and rear faces 14 and 16, until it eventually strikes bottom surface 20 of the refractive element 6. If the secondary beam 24 has sufficient energy when it reaches the bottom surface 20, an absorbing plate 26 can be attached to the bottom surface 20 to absorb the energy of the secondary beam 24 to prevent any unwanted thermal effects to the refractive element 6 or bottom surface 20.

At each of the internal reflections of the secondary beam 24, most of the secondary beam 24 is transmitted to form detector beams $28_1$, $28_2$, $28_3$, and $28_4$. Since the secondary beam 24 is attenuated by each of these partial transmissions, each successive detector beam 28 is lower in power than the previous detector beam 28. This results in the generation of a plurality of detector beams $28_1 \ldots 28_4$, and a primary beam 22, all having different power intensities. Detectors $30_0 \ldots 30_4$ are positioned to receive the primary beam 22 and the detector beams $28_1 \ldots 28_4$ as they exit the refractive element 6.

The production of the plurality of detector beams 28 is accomplished without coated optics or neutral density filters. Therefore, the ratio of detector beam power levels are relatively insensitive to large changes in wavelength. Further, there is only a single optical element used to generate the plurality of detector beams 28, thus minimizing the complexity and cost of the detector system, as well as the space used to create and sample the plurality of detector beams 28.

The path, direction and attenuation of every reflected and transmitted beam are dictated by the wedge angle $\Theta$, the thickness and refractive index of the refractive element, and the angle of incidence $\alpha$ of the pick-off beam 10. These values can be chosen to provide the desired ratio of detector beam intensities and geometric configuration. For example, if the wedge angle $\Theta$ is very small, the separation between the detector beams 28 will be small. If the wedge angle $\Theta$ is very large, the angles incidence of the secondary beam 24 against faces 14 and 16 will be correspondingly large. If an angle of incidence of the secondary beam 24 becomes too large, undesirable effects might occur. For example, an angle of incidence greater than 15° results in significant different reflectivities for the S and P polarizations. Further, once an angle of incidence reaches the critical angle, total internal reflection will result, and no detector beam will exit the refractive element 6 from such a reflection.

The detector system of the present invention is ideal for several specific types of laser systems. The first example is a laser system that generates a wide range of output powers. Detectors $30_0 \ldots 30_4$ can all be power detectors having varying operational ranges. As laser power increases, the first detector $30_0$ monitoring the primary beam 22 becomes saturated. At that point, the second detector $30_1$ is operating within its operational range. As the second detector $30_1$ becomes saturated, the third detector $30_2$ is operating within its operational range, and so on. Therefore, no matter what the output beam power, one of the detectors $30_0 \ldots 30_4$ would always be receiving a detector beam 28 having a power level within its operational range.

Another ideal laser system for using the detector system of the present invention is one that requires several different parameters to be measured. In such a system, each detector $30_1 \ldots 30_4$ is of a different type to measure the different laser beam parameters. For example, detector $30_0$ could be a photocell for measuring average power with a relatively high optical input operational range, and detector $30_1$ could be a photo-diode for measuring the output beam pulse width with a relatively moderate optical input operational range, and detector $30_2$ could be a quad detector for measuring spatial modes with a very low input power operational range, and so on. In such a system, all these parameters can be simultaneously measured by different detectors having widely different optical input operational ranges, without being overly sensitive to wavelength changes.

An additional laser system ideal for using the detector system of the present invention is a laser system that produces several output laser beams with different wavelengths and output powers. An example of such a laser system is a composite laser system, which contains a plurality of cavities each of which having a different gain medium. Each cavity is designed to produce a unique output beam, with its own output power, pulse width, and wavelength. Such a laser system is capable of producing continuous or pulsed output, long pulses or short pulses, high or low power, and all at a wide variety of different power levels and wavelengths. A single detector could be used to measure output power at multiple wavelengths because the attenuation created by the refractive element 6 is substantially independent of wavelength. The detector system of such a composite laser system could also be used to measure different beam parameters from each of these cavities. The plurality of detector beams 28 produced by the refractive element 6 would have a wide enough range of relative optical powers that detectors of different types having different operational ranges could be used together to accurately monitor the output beam at any operation state.

Figure 2:
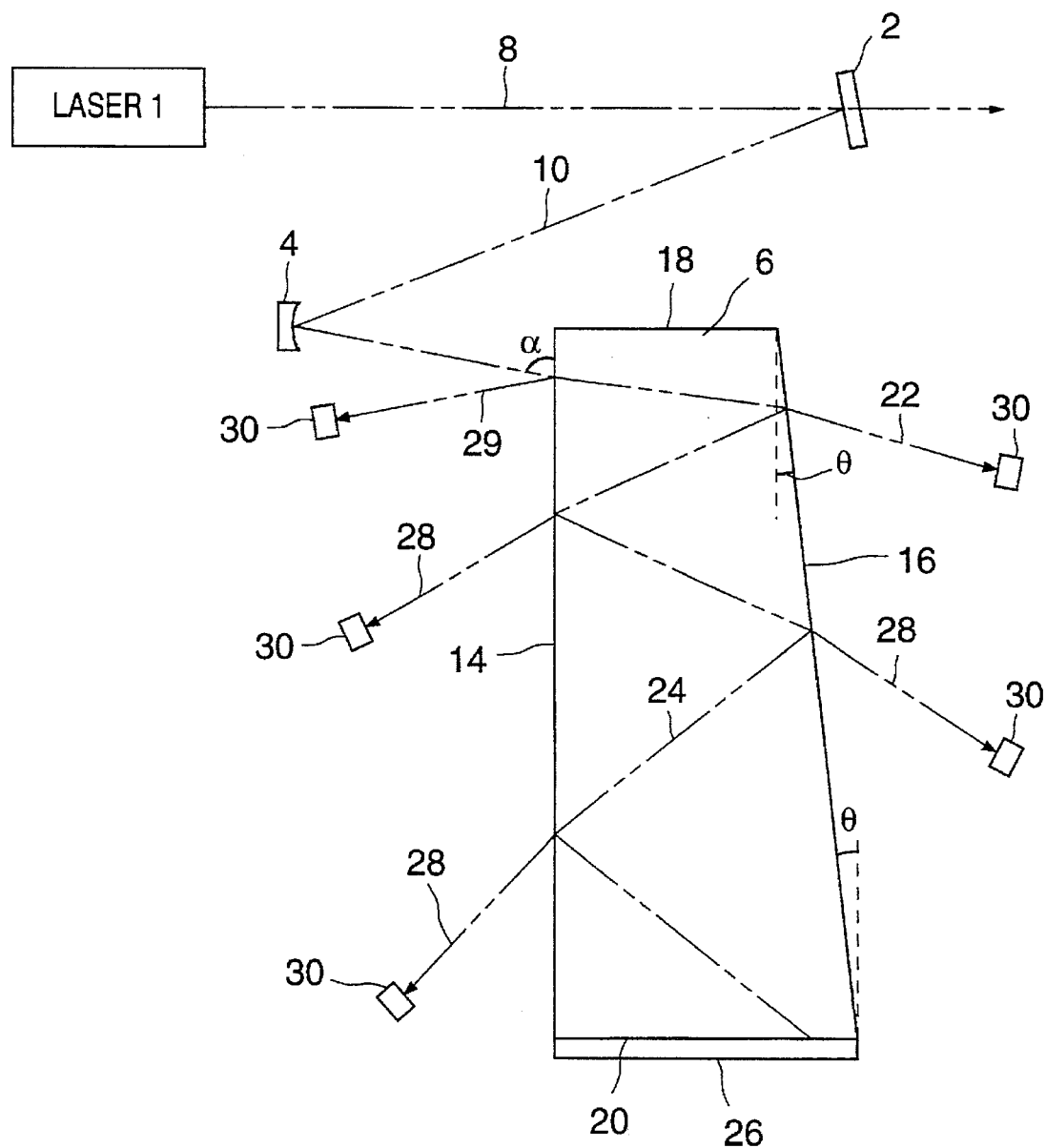
FIG. 2 is a top plan view of the detector system illustrating a pick-off beam with a non-normal angle of incidence into the refractive element.

In an alternate embodiment of the configuration of the preferred embodiment of FIG. 1, the refractive element 6 can be tilted such that the angle of incidence $\alpha$ of the pick-off beam 10 at face 14 can be a non-normal angle, as illustrated in FIG. 2. Beam 29 is present in the previous embodiment, but is coincident with the pick-off beam 10. The incoming light is partially reflected upon entry into the refractive element 6 at the front face 14, to create another detector beam 29. The relative intensities of the detector beams 28, as well as their geometric configuration, can be optimized for a particular application, by modifying the wedge angle $\Theta$, width and refractive index of element 6, as well as the angle of incidence $\alpha$ of the incoming pick-off beam 10.

Figure 3:
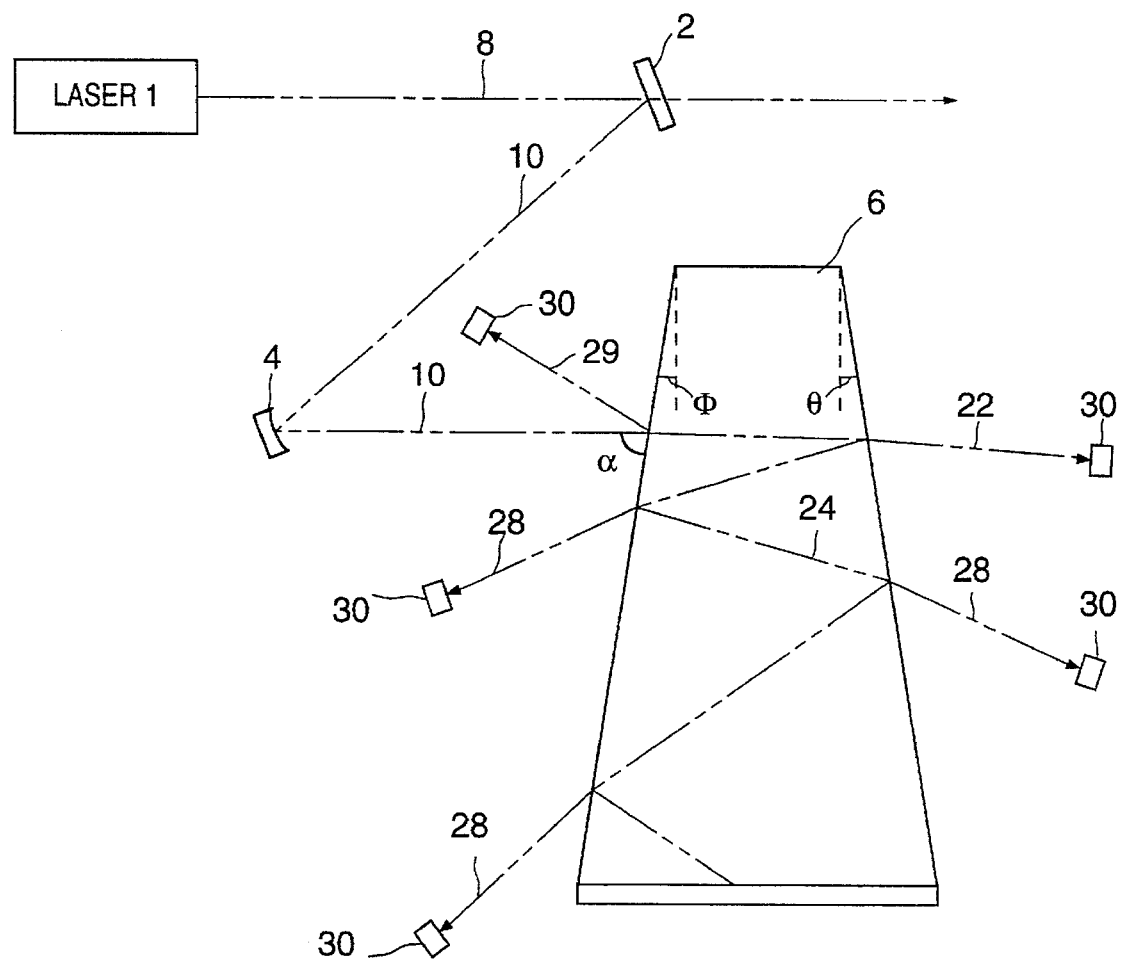
FIG. 3 is a top plan view of the refractive element with multiple wedge angles.

In yet another embodiment of the present invention, a second wedge angle $\Phi$ can be provided by front face 14, as illustrated in FIG. 3. Different combinations of the angle of incidence $\alpha$, wedge angle $\Theta$, and second wedge angle $\Phi$ can be used to create the desired detector beam power levels and geometric configuration for a particular application.

Figure 4:
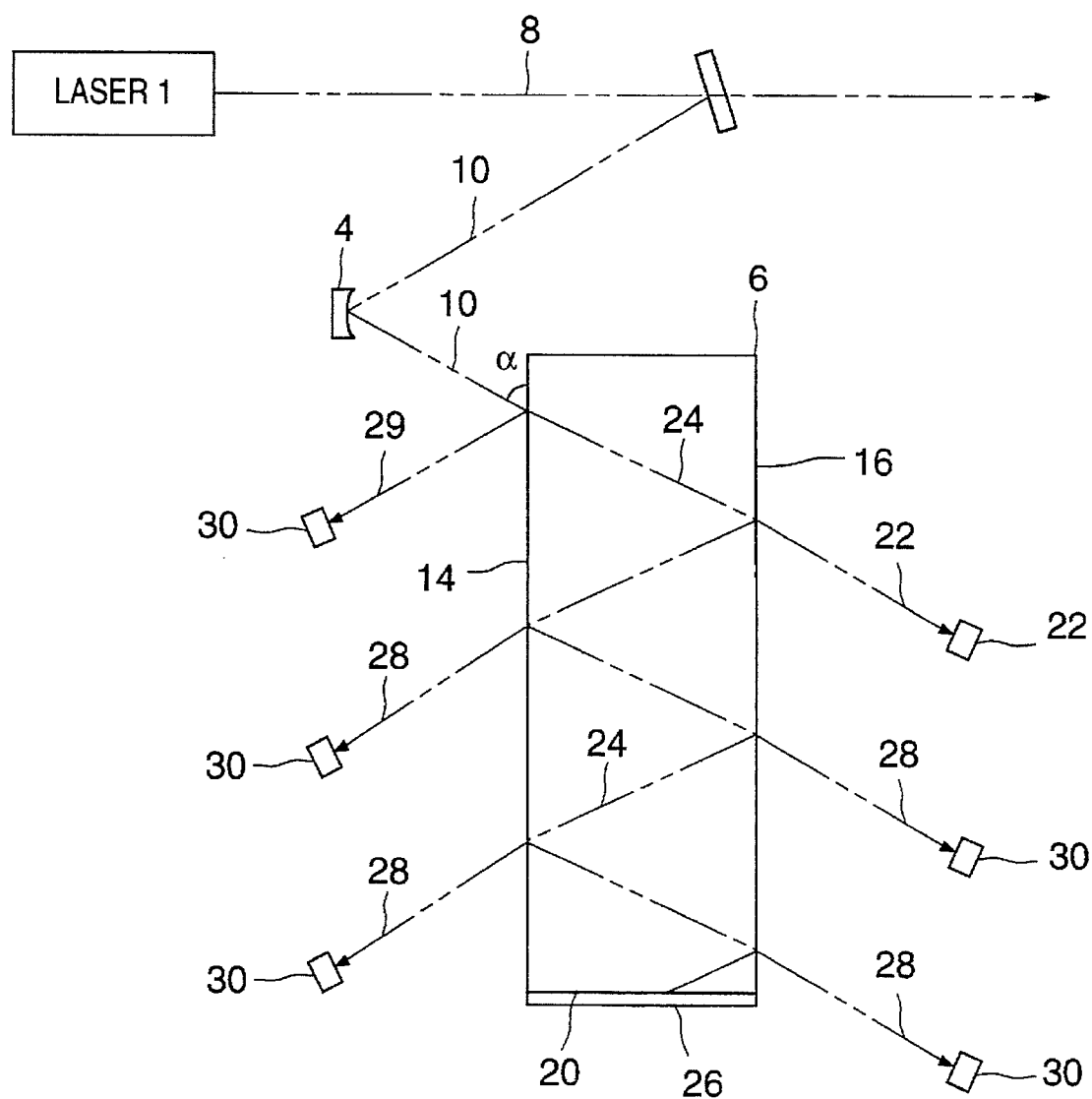
FIG. 4 is a top plan view of the refractive element having parallel front and rear faces.

The refractive element 6 could also have parallel faces 14 and 16, as shown in FIG. 4. If the angle of incidence $\alpha$ of the pick-off beam 10 is not normal to front face 14, multiple internal reflections occur to create the plurality of detector beams 28. This embodiment, however, produces less detector beam separation. In order to increase the separation of the detector beams, the thickness of the refractive element 6 and/or the angle of incidence $\alpha$ would have to be increased.

Figure 5:
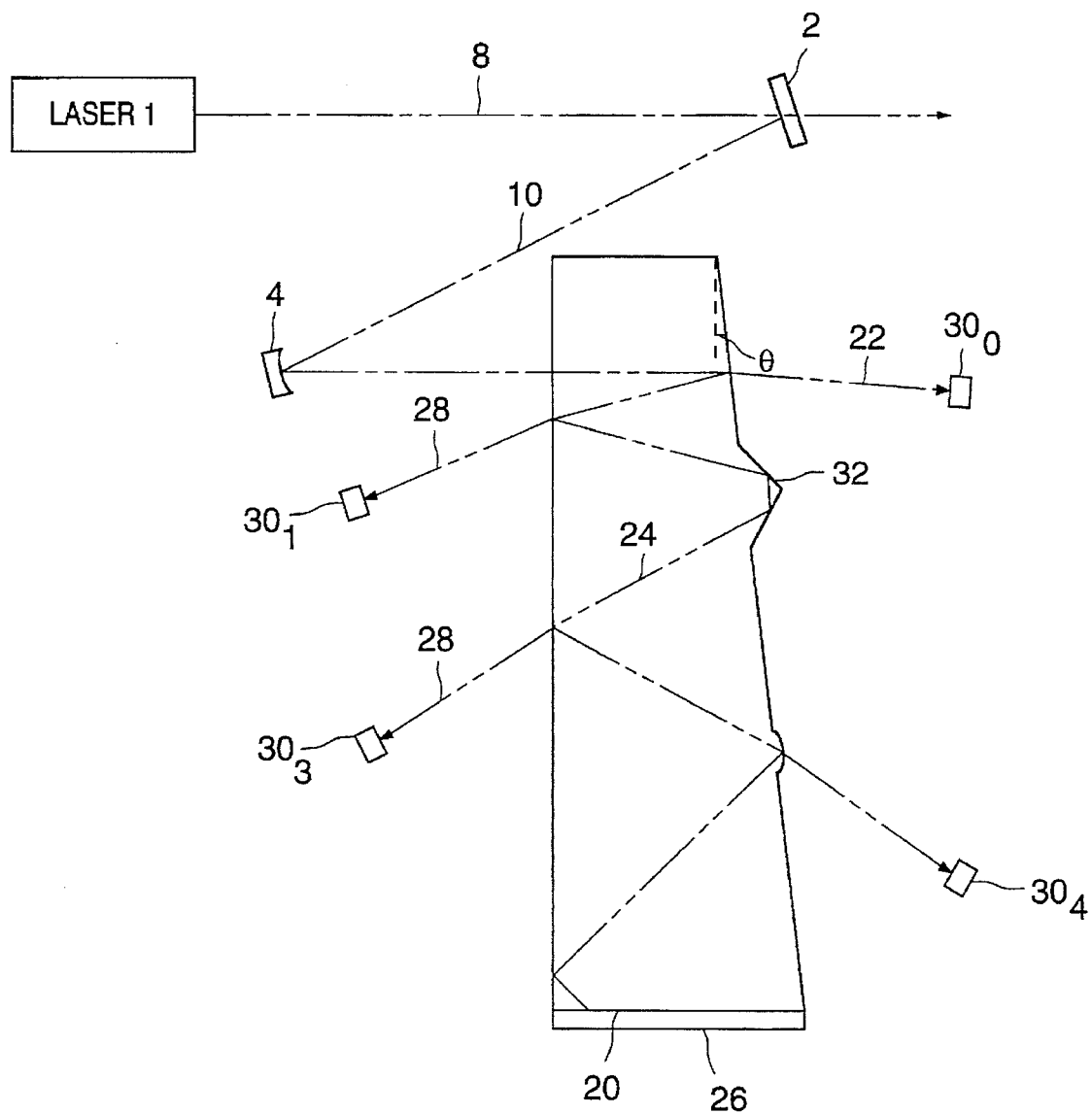
FIG. 5 is a top plan view of the refractive element having a non-planar rear face.

A further embodiment of the present invention is illustrated in FIG. 5. Front and/or rear faces 14 and 16 have non-planar shaped regions to manipulate the primary beam 22, secondary beam 24, and/or the detector beams 28. For example, protrusion 32 totally internally reflects the secondary beam 24, thus allowing for a larger separation between detectors $30_1$ and $30_4$. Shaped portion 34 is a rounded surface that acts as a lens to focus the detector beam 28 exiting therethrough. Therefore, by providing non-planar portions of front and rear faces 14 and 16, the beams can be further manipulated.

Figure 6:
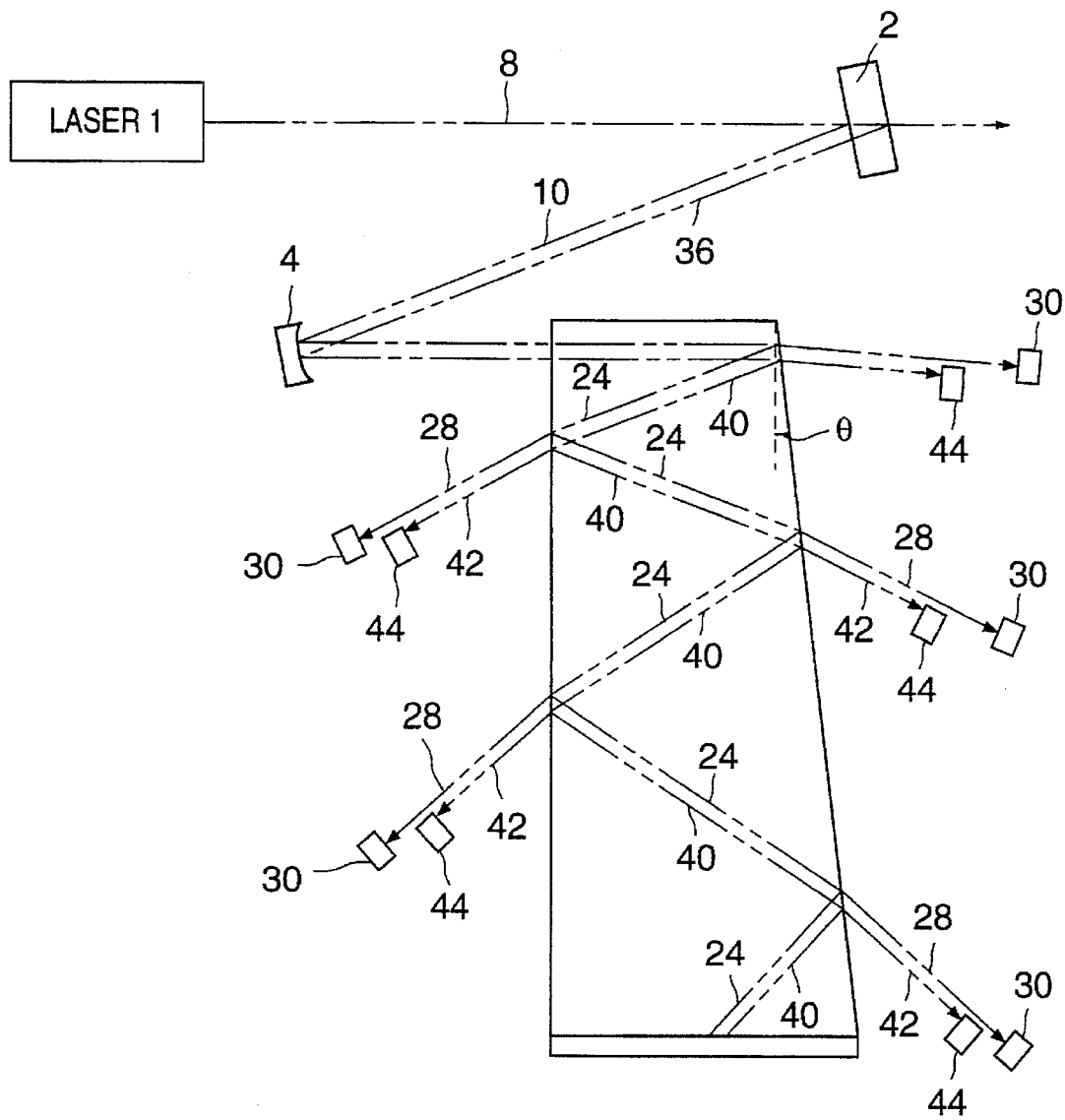
FIG. 6 is a top plan view of the detector system with back-up detectors.

Another embodiment of the present invention is illustrated in FIG. 6. In this embodiment, a second set of duplicate detectors $44_0 \ldots 44_4$ is used as a safety back-up to monitor the output laser beam 8. A second pick-off beam 36 is generated by the reflection of the laser's output beam 8 at the rear surface of beam splitter 2. The second pick-off beam 36 produces a second primary beam 38, a second secondary beam 40, and a second set of detector beams 42 for a second set of detectors 44. The second set of detectors 44 is used as a backup, such that if a detector in the first set of detectors $30_0 \ldots 30_4$ fails, such as a power level detector, the corresponding backup detector 44 measuring power will detect the true output power.

To further optimize the detector beam intensities, optical coatings can be selectively applied to front and rear faces 14 and 16 to provide the desired ratio of power levels among the various detector beams.

Figure 7:
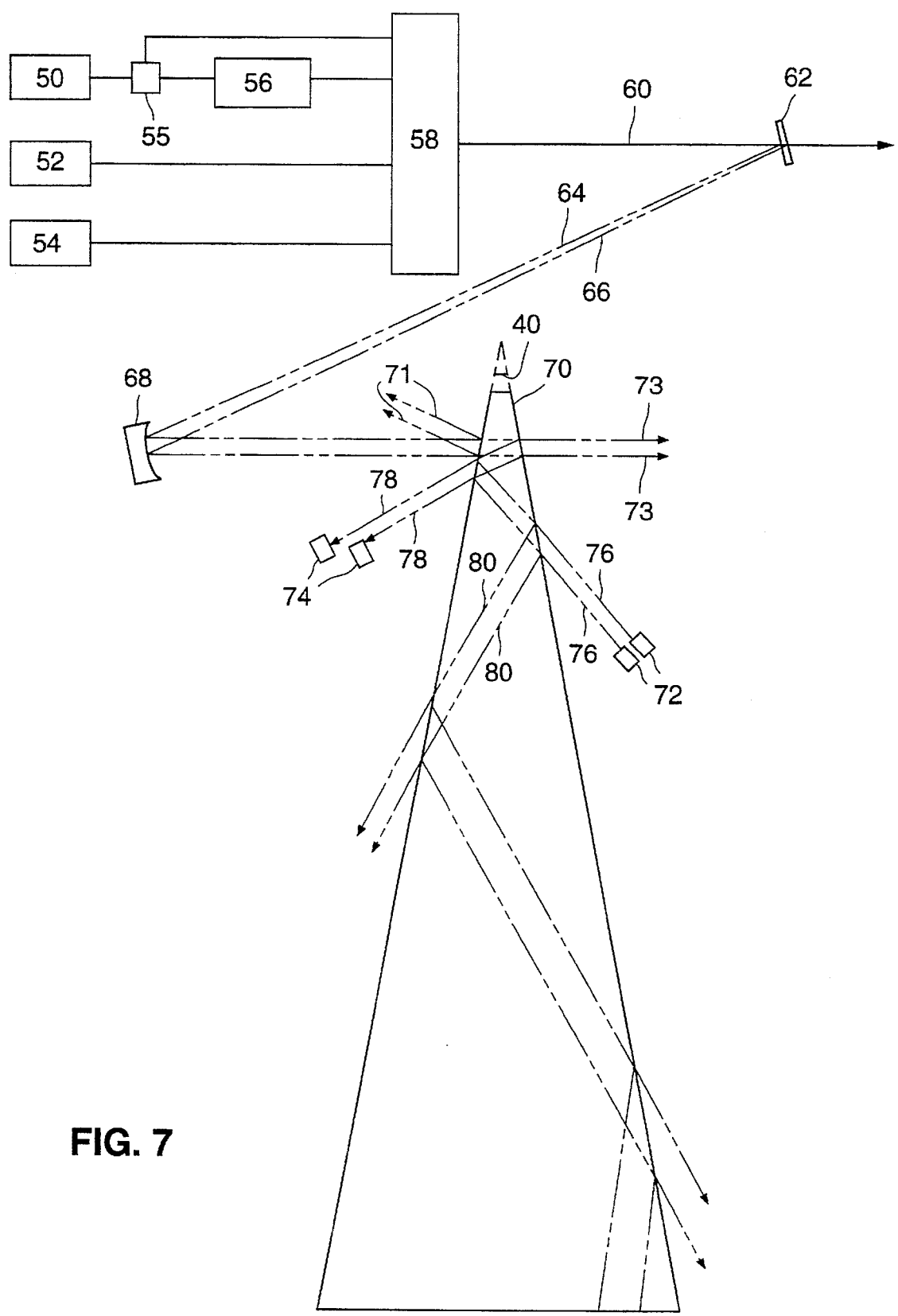
FIG. 7 is a plan view of a composite laser system incorporating the detector system of the present invention.

A composite laser system using the refractive element of the present invention which is being developed for commercial release is illustrated in FIG. 7. This composite laser system includes three laser cavities 50, 52, and 54, an external doubling crystal 56, and a combining means 58 for combining the separate beams from the cavities 50/52/54 into a single laser system output beam 60. Cavity 50 is a Q-switched Nd:Yag laser cavity that produces 1064 nm light at 10 Hz with pulse energies of 400 mJ and pulse widths of 5 ns. Cavity 52 is an intra-cavity doubled Nd:Yag laser cavity using a KTP doubling crystal that produces 532 nm light at 6 Hz with pulse energies of about 0.2–1.75 J and pulse widths of 2–10 ms. A laser formed in this manner is described in greater detail in co-pending application Ser. No. 08/369,465, filed Jan. 6, 1995, now U.S. Pat. No. 5,558,667, assigned to the same assignee as herein. Cavity 54 is a Q-switched Alexandrite laser cavity that produces 755 nm light at 10 Hz with pulse energies of 500 mJ and pulse widths of 60 ns. A selection device 55 is mounted to intercept the output of the cavity 50 and alternately direct the output beam directly to the combining means, or to the external doubling crystal. When the output beam from cavity 50 is directed to the external doubling crystal 56, the crystal produces 532 nm light at 10 Hz with pulse energies of 200 mJ and pulse widths of 4 ns. The crystal output, combined with the residual fundamental output from cavity 50, can be separated before entering combining means 58, or by combining means 58. Therefore, this composite laser system is capable of four different possible unique output beams. These unique beams are combined by the combining means 58 to form a single output beam 60. The combining means 58 can be rotating mirrors or a prism, that capture a given unique beam and reflect that beam out as the output beam 60.

The output beam 60 passes through beam splitter 62 which reflects part of the output beam (about 2%) at each surface, to create two pick-off beams 64 and 66 in the same manner as shown in FIG. 6. The beam splitter 62 is slightly wedged, to better separate pick-off beams 64 and 66. Focusing mirror 68, having a focal length of 125 mm focuses the pick-off beams 64/66 and directs them to refractive element 70. Refractive element 70 is a fused silica wedge having a 4° wedge angle. Pick-off beams 64/66 strike the refractive element surface at an angle of incidence of 5°, producing reflection beams 71, secondary beams 80, primary beams 73, and detector beams 76 and 78. Silicon photo-diode detectors 72/74 (from Centronic Inc., part no. OSD15-0) are aligned with the detector beams 76 and 78 respectively, which exit the refractive element 70 after the first and second internal reflections of secondary beams 80. The detectors 74 measure the output power of the composite laser system when the intra-cavity doubled cavity 52 is in operation, and detectors 72 measure the output power of the composite laser system when the Nd:Yag cavity 50 (either fundamental or doubled output) or the Alexandrite cavity 54 is in operation. Diffusers can be placed in front of the detectors, to eliminate the effects of movement in the detector beams and to further attenuate the detector beams.

The relative intensities of the different beams depend upon the different angles of incidence, the refractive index (for each wavelength), and the state of the polarization. Since the wavelength of the beams varies only between 532 to 1064 nm, and the angles of incidence are relatively low (below 20° thus negating significant polarization effects), it can be roughly estimated that at each reflection, about 4% of each beam is reflected and 96% of each beam is transmitted. Therefore, if I is the intensity of pick-off beams 64/66 as they enter the refractive element 70, then the remaining beams have the following approximate intensities:

| Beams | Intensity as a Percentage of I |
| --- | --- |
| 71 | 4% |
| 73 | 92% |
| 78 | 3.7% |
| 76 | 0.15% |

The above embodiment provides two different attenuated detector beams 78/76 having 3.7% and 0.15% of the intensity of pick off beams 64/66, to allow detectors 72/74 to effectively monitor the output beam at multiple wavelengths (1064 nm, 532 nm, and 755 nm) whereby the attenuation of the different wavelengths is substantially the same.

It is to be understood that the present invention is not limited to the embodiments described above and illustrated herein, but encompasses any and all variations falling within the scope of the appended claims. For example, the number of detector beams and detectors can vary from the numbers illustrated in the figures. Further, the laser beam 8 can be passed directly through the refractive element 6, without the aid of a beam splitter or focusing mirror.

What is claimed is:

1. A detector system for monitoring a laser beam, comprising:

a refractive element having a pair of opposing spaced-apart faces, said refractive element being transmissive to the laser beam and located such that when the laser beam enters said refractive element through one of said faces, the laser beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities from each other and from said primary output beam; and a plurality of detectors aligned with the plurality of the output beams exiting the refractive element with different power levels, said detectors for measuring beam characteristics of said output beams which correspond to beam characteristics of the laser beam.

2. The detector system of claim 1, wherein said detectors are aligned with at least two of said output beams having different attenuations from said refractive element.

3. The detector system of claim 1, wherein the pair of faces are parallel, and the laser beam enters said refractive element through said one face at an angle of incidence that is not normal to said one face, whereby a portion of the laser beam is reflected from said one face.

4. The detector system of claim 1, wherein the pair of faces are not parallel.

5. The detector system of claim 4, wherein the laser beam enters said refractive element through said one face at an angle of incidence that is not normal to said one face, whereby part of the laser beam is reflected from said one face.

6. The detector system of claim 1, wherein at least one of said faces has a non-planar region.

7. The detector system of claim 6, wherein said non-planar region functions to totally internally reflect the secondary beam.

8. The detector system of claim 6, wherein said non-planar region functions as a lens for focusing at least one of said output beams exiting therefrom.

9. A detector system for monitoring a laser beam, comprising:

a refractive element having a pair of opposing spaced-apart faces, said refractive element being transmissive to the laser beam and located such that when the laser beam enters said refractive element through one of said faces, the laser beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities from each other;

a plurality of detectors aligned with one or more of the output beams exiting the refractive element for measuring beam characteristics of said output beams which correspond to beam characteristics of the laser beam; and an energy absorbing means attached to said refractive element to absorb said secondary beam after a predetermined number of said reflections.

10. The detector system of claim 1, wherein each of said plurality of detectors have a unique operational input power range that are matched to a corresponding one of said output beams.

11. An optical detector system, comprising:

a laser system means for producing a laser system output beam;

a beam splitter optic for reflecting part of the laser system output beam;

a refractive element positioned to received the reflected part of the output beam and including a pair of opposing spaced-apart faces, said refractive element being transmissive to said laser system output beam reflected from said beam splitter optic and located such that when said reflected laser system output beam enters said refractive element through one of said faces, said laser system output beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities from each other and from said primary output beam; and a plurality of detectors aligned with the plurality of said output beams exiting said refractive element with different power levels, said detectors for measuring beam characteristics of said output beams which correspond to beam characteristics of said laser system output beam.

12. The detector system of claim 11, wherein said detectors are aligned with at least two of said output beams having different attenuations from said refractive element.

13. An optical detector system comprising:

a laser system means for producing a laser system output beam;

a beam splitter optic for reflecting part of the laser system output beam;

a refractive element positioned to received the reflected part of the output beam and including a pair of opposing spaced-apart faces, said refractive element being transmissive to said laser system output beam reflected from said beam splitter optic and located such that when said reflected laser system output beam enters said refractive element through one of said faces, said laser system output beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities; and a plurality of detectors aligned with one or more of said output beams exiting said refractive element for measuring beam characteristics of said output beams which correspond to beam characteristics of said laser system output beam;

wherein said laser system means is a composite laser system which includes a plurality of laser cavities, each of said cavities containing a gain medium for outputting a unique laser beam, said unique laser beams from said cavities are combined to form the laser system output beam.

14. The detector system of claim 13, further comprising:

a focusing mirror for directing said laser system output beam from said beam splitting optic into the refractive element.

15. The detector system of claim 13, wherein:

said beam splitting optic reflects the part of the laser system output beam to the refractive element in the form of a first beam and a safety beam, wherein said first beam is split into the primary output beam and the secondary beam at said other of said faces to produce said plurality of attenuated output beams, and said safety beam is split into a safety primary output beam and a safety secondary beam at said other of said faces, said safety primary output beam exiting said refractive element through the other of said faces, said safety secondary beam undergoing multiple internal reflections off of said faces wherein a portion of said safety secondary beam is transmitted out of said refractive element at each of said reflections to form a plurality of attenuated safety output beams having different power intensities from each other; and said detector system further comprising a plurality of safety detectors aligned with one or more of said output beams exiting the refractive element for measuring beam characteristics of said safety output beams which correspond to beam characteristics of said laser system output beam.

16. The detector system of claim 15, wherein the pair of faces are parallel, and the laser system output beam enters said refractive element through said one face at an angle of incidence that is not normal to said one face, whereby a portion of the laser system output beam is reflected from said one face.

17. The detector system of claim 13, wherein the pair of faces are not parallel.

18. The detector system of claim 17, wherein the laser system output beam enters said refractive element through said one face at an angle of incidence that is not normal to said one face, whereby part of the laser system output beam is reflected from said one face.

19. The detector system of claim 13, wherein at least one of said faces has a non-planar region.

20. The detector system of claim 19, wherein said non-planar region functions to totally internally reflect the secondary beam.

21. The detector system of claim 19, wherein said non-planar region functions as a lens for focusing at least one of said output beams exiting therefrom.

22. The detector system of claim 13, further comprising:

an energy absorbing means attached to said refractive element to absorb said secondary beam after a predetermined number of said reflections.

23. The detector system of claim 13, wherein each of said plurality of detectors have a unique operational input power range that are matched to a corresponding one of said output beams.

24. An optical detector system, comprising:

a laser system that produces a laser system output beam that can generate at least two different wavelengths;

a beam splitter optic for reflecting part of the laser system output beam;

a refractive element positioned to receive the reflected part of the output beam and including a pair of opposing spaced-apart faces, said refractive element being transmissive to said laser system output beam reflected from said beam splitter optic and located such that when said reflected laser system output beam enters said refractive element through one of said faces, said laser system output beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities; and at least one detector aligned with one of said output beams exiting said refractive element, wherein the attenuation of said one output beam is substantially the same for the different wavelengths in the laser system output beam.

25. A laser system comprising:

a plurality of laser cavities, each of said cavities containing a gain medium for outputting a unique laser beam;

means for combining said unique laser beams from said cavities to form a laser system output beam;

a beam splitter optic for reflecting part of the laser system output beam;

a refractive element positioned to receive the reflected part of the output beam and having a pair of opposing spaced-apart faces, said refractive element being transmissive to the laser beam and located such that when the laser beam enters said refractive element through one of said faces, the laser beam is split into at least a primary output beam and a secondary beam at said other of said faces, said primary output beam exiting said refractive element through the other of said faces, said secondary beam undergoing multiple internal reflections off of said faces wherein a portion of said secondary beam is transmitted out of said refractive element at each of said reflections to form a plurality of increasingly attenuated output beams having different power intensities from each other; and a plurality of detectors aligned with one or more of the output beams exiting the refractive element for measuring beam characteristics of said output beams which correspond to beam characteristics of the laser beam.

26. The laser system of claim 25, wherein said cavities are a Q-switched Nd:yag laser cavity, an intra-cavity frequency doubled Nd:Yag laser cavity, and a Q-switched Alexandrite laser cavity.

27. The laser system of claim 26, wherein:

a detector of said plurality of detectors is aligned with one of the output beams exiting said refractive element for measuring the output power of said intra-cavity frequency doubled Nd:Yag laser cavity, and another detector of said plurality of detectors is aligned with a different one of the output beams exiting said refractive element for measuring the output power of said Q-switched Nd:Yag and Alexandrite laser cavities, and wherein the level of attenuation of said different one output beam is greater than said one output beam.

* * * * *